US010033090B2

(12) United States Patent
Merricks et al.

(10) Patent No.: US 10,033,090 B2
(45) Date of Patent: Jul. 24, 2018

(54) DIGITAL RADIO RECEIVER SYSTEM

(71) Applicant: NEW DAWN INNOVATIONS LTD, Alton, Hampshire (GB)

(72) Inventors: Jonathan Merricks, Alton (GB); Dan Copley, Alton (GB)

(73) Assignee: NEW DAWN INNOVATIONS LTD, Alton, Hampshire (GB)

(*) Notice: Subject to any disclaimer, the term of this patent is extended or adjusted under 35 U.S.C. 154(b) by 0 days.

(21) Appl. No.: 15/118,787

(22) PCT Filed: Feb. 16, 2015

(86) PCT No.: PCT/GB2015/000056
§ 371 (c)(1),
(2) Date: Aug. 12, 2016

(87) PCT Pub. No.: WO2015/121609
PCT Pub. Date: Aug. 20, 2015

(65) Prior Publication Data
US 2017/0055077 A1 Feb. 23, 2017

(30) Foreign Application Priority Data

Feb. 14, 2014 (GB) .................................. 1402627.2
Apr. 28, 2014 (GB) .................................. 1407434.8

(51) Int. Cl.
*H04B 1/00* (2006.01)
*H01Q 1/32* (2006.01)
(Continued)

(52) U.S. Cl.
CPC ........... *H01Q 1/3275* (2013.01); *F03D 80/82* (2016.05); *G01S 19/13* (2013.01); *H01Q 1/2291* (2013.01);
(Continued)

(58) Field of Classification Search
CPC ...... H04R 2499/13; H04R 3/12; B60R 19/48; B60R 11/02; B60R 2011/004
(Continued)

(56) References Cited

U.S. PATENT DOCUMENTS 4,266,227 A * 5/1981 Blaese .................... H01Q 1/084
343/715
5,161,255 A 11/1992 Tsuchiya
(Continued)

FOREIGN PATENT DOCUMENTS

CN 203289415 U 11/2013
CN 204130687 U 1/2015
(Continued)

OTHER PUBLICATIONS

Search Report from the United Kingdom Intellectual Property Office dated Jul. 1, 2015 for corresponding application No. GB1502588.5.
(Continued)

*Primary Examiner* — Alexander Jamal
(74) *Attorney, Agent, or Firm* — David D. Brush; Westman, Champlin & Koehler, P.A.

(57) ABSTRACT

A digital radio receiver system is provided as a single module for retro-fit connection to the external antenna connector of a vehicle or the like. The system includes an antenna connected to a radio receiver which is configured to scan and receive digital radio channels through the antenna. There is also a wireless communications module for wirelessly transmitting to an external display and control unit information relating to the available channels and for receiving back a selected channel. A transmitter is provided for decoding a selected channel and transmitting it as a modulated signal down a wired feed from the eternal antenna connector to an analog radio head unit for output on a given
(Continued)

channel. A renewable energy unit is provided on the module for powering the receiver, communications module and transmitter.

17 Claims, 12 Drawing Sheets

(51) Int. Cl.

| | | |
|---|---|---|
| *H04H 20/62* | (2008.01) | |
| *H01Q 1/22* | (2006.01) | |
| *F03D 80/80* | (2016.01) | |
| *G01S 19/13* | (2010.01) | |
| *H04R 3/12* | (2006.01) | |
| *H04W 4/80* | (2018.01) | |
| *H04W 76/14* | (2018.01) | |
| *H04H 20/08* | (2008.01) | |
| *F03D 9/00* | (2016.01) | |

(52) U.S. Cl.
CPC ............... *H04H 20/62* (2013.01); *H04R 3/12* (2013.01); *H04W 4/80* (2018.02); *H04W 76/14* (2018.02); *F03D 9/00* (2013.01); *H04H 20/08* (2013.01)

(58) Field of Classification Search
USPC .............................. 381/86, 3, 77; 455/575.9
See application file for complete search history.

(56) References Cited

U.S. PATENT DOCUMENTS

| | | | |
|---|---|---|---|
| 5,233,227 A | 8/1993 | Kajimoto et al. | |
| 5,746,283 A | 5/1998 | Brighton | |
| 8,793,034 B2 | 7/2014 | Ricci | |
| 2002/0000785 A1 | 1/2002 | Ganz | |
| 2003/0080907 A1 | 5/2003 | Wang et al. | |
| 2005/0068238 A1 | 3/2005 | Haaft et al. | |
| 2005/0243002 A1* | 11/2005 | Wa Hung ............. | B60Q 1/2661 343/711 |
| 2007/0008234 A1 | 1/2007 | Capps et al. | |
| 2007/0010222 A1 | 1/2007 | Van Hoff et al. | |
| 2009/0058679 A1* | 3/2009 | Lauterbach ............ | G08G 1/093 340/905 |
| 2009/0262033 A1 | 10/2009 | King et al. | |
| 2012/0131098 A1* | 5/2012 | Wood .................... | G06F 3/0482 709/203 |
| 2013/0002481 A1 | 1/2013 | Solomon | |
| 2013/0314023 A1 | 11/2013 | Collier | |
| 2014/0166820 A1 | 6/2014 | Hilleary | |

FOREIGN PATENT DOCUMENTS

| | | | | |
|---|---|---|---|---|
| DE | 102005023091 A1 | 11/2006 | | |
| EP | 0949771 A2 | 10/1999 | | |
| EP | 1571766 A2 | 9/2005 | | |
| EP | 2495895 A2 | 9/2012 | | |
| GB | 2379914 A | 3/2003 | | |
| GB | 2490145 A | 10/2012 | | |
| JP | 2006092250 A | 4/2006 | | |
| KR | 20090080710 A | 7/2009 | | |
| WO | WO 2005086394 A1 * | 9/2005 | ............. | H04H 20/08 |

OTHER PUBLICATIONS

International Search Report dated May 19, 2015, for corresponding International Application No. PCT/GB2015/000058, filed Feb. 16, 2015.
Frontier Silicon, "Connecting to the After-Market—New Products, World DMB European Automotive Event: 'Digital Radio Connecting the Car'", Nov. 14, 2012.
Written Opinion of the International Searching Authority dated May 19, 2015, for corresponding International Application No. PCT/GB2015/000058, filed Feb. 16, 2015.
International Search Report dated May 18, 2015, for corresponding International Application No. PCT/GB2015/000056, filed Feb. 16, 2015.
Written Opinion of the International Searching Authority dated May 18, 2015, for corresponding International Application No. PCT/GB2015/000056, filed Feb. 16, 2015.
Search Report from the United Kingdom Intellectual Property Office dated Aug. 17, 2105 for corresponding application No. GB1502560.4.
Office Action dated Apr. 2, 2018 for corresponding U.S. Appl. No. 15/118,772, filed Aug. 12, 2016.

* cited by examiner

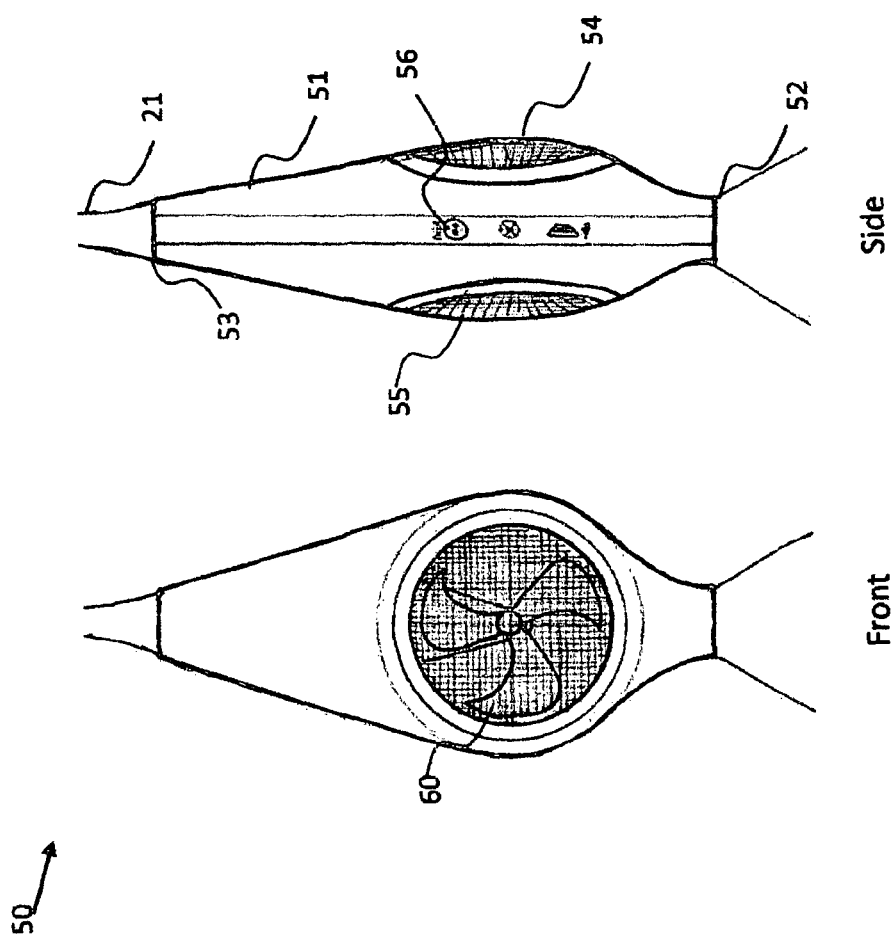

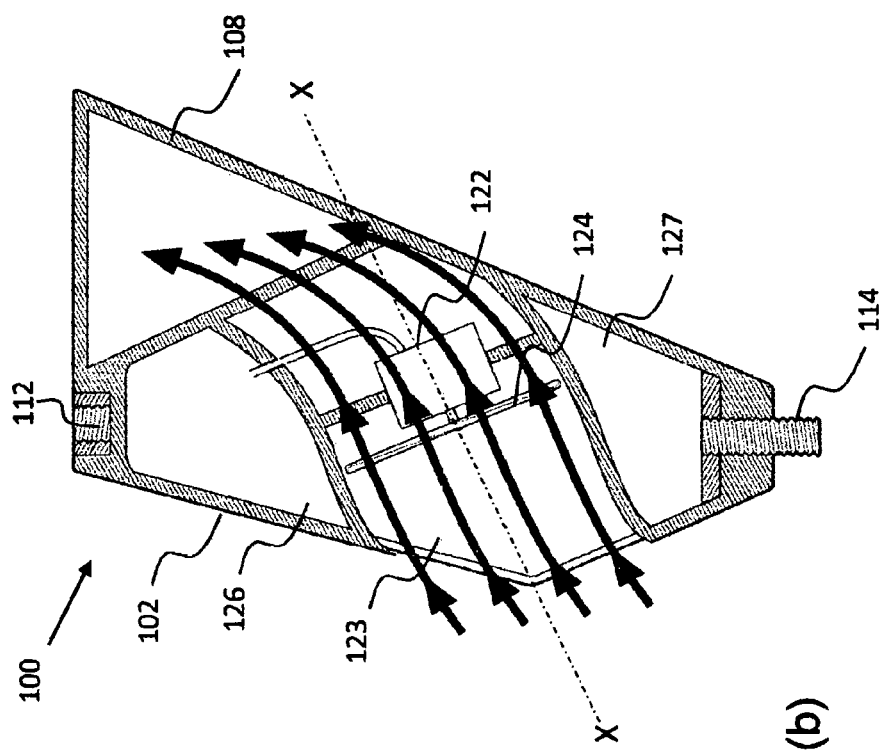
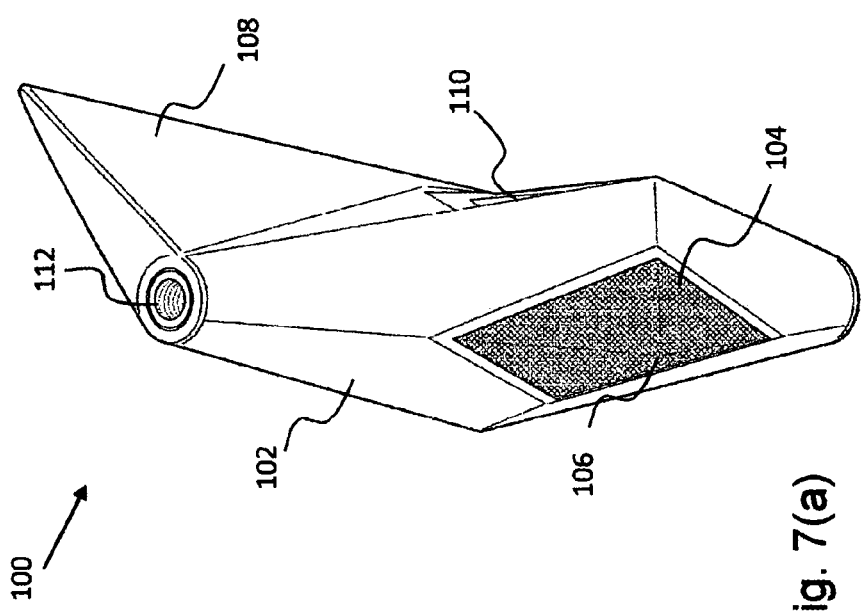
Fig. 7(b)
Fig. 7(a)

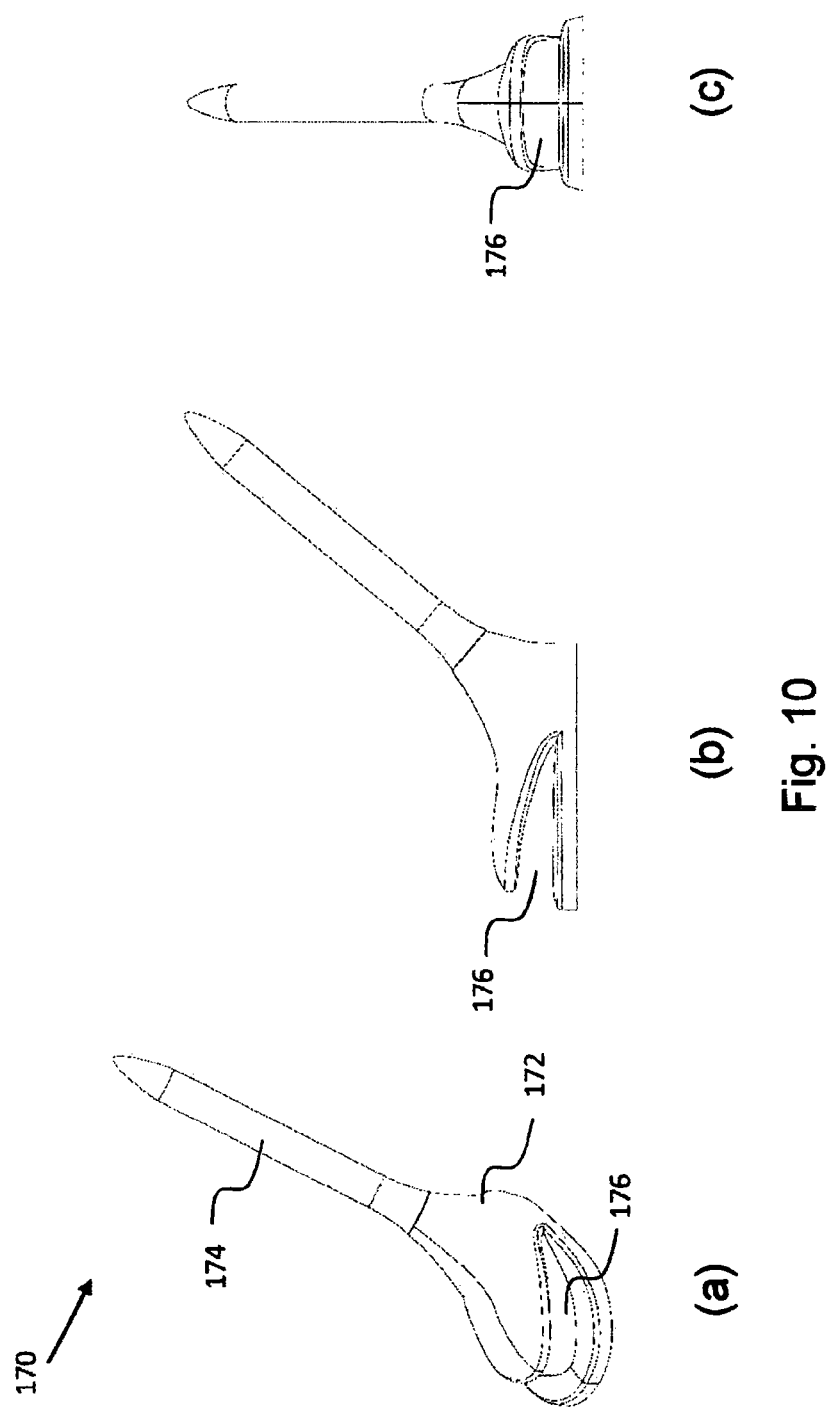

DIGITAL RADIO RECEIVER SYSTEM

This Application is a Section 371 National Stage Application of International Application No. PCT/GB2015/000056, filed Feb. 16, 2015, which is incorporated by reference in its entirety and published as WO 2015/121609 A1 on Aug. 20, 2015, in English.

FIELD OF THE INVENTION

This invention relates to a digital radio receiver system, particularly, though not exclusively one for a vehicle.

BACKGROUND OF THE INVENTION

Digital radio, for example Digital Audio Broadcast (DAB) technology, enables large numbers of radio stations to be received terrestrially on special digital receiver systems. Along with the audio signal, data identifying the channel name, current presenter, song etc. is also broadcast so that it can be displayed on a display of the reader. The signal transmission is generally considered more robust as it does not suffer from the gradual fading experienced by analogue radio technologies.

In vehicle radio systems, there is currently a limited take-up of in-situ digital receivers for DAB. A limited number of new vehicles are provided with DAB as standard and, as an optional upgrade feature, the additional cost tends to deter take-up. For older cars, replacement of the original head unit tends to be expensive also, and inconvenient, requiring technical specialists.

Retro-fit solutions do exist but tend also to be inconvenient. One method is to attach a DAB antenna to the windscreen (in the manner of a stand-alone satellite navigation device) which is connected to a stand-alone control unit also connected to the windscreen or dashboard. Power is provided via the cigarette lighter socket to the control unit and transmission of the received DAB signal is via a FM transmitter to a selected free frequency manually tuned at the in-situ head unit, or plugged into an Aux-In port if one is available. In general, retrofit solutions require a special DAB aerial, dedicated control panel, and connection to the car's battery via the cigarette lighter or via the internal loom. In some cases, specialised installing is required, and overall the solutions tend to be fairly expensive and intrusive, involving additional wires and components to be stuck to the windscreen or dashboard.

SUMMARY OF THE INVENTION

A first aspect of the invention provides a digital radio receiver system for connection to a wired feed to a radio head unit, e.g. in a vehicle, the system comprising: a digital radio receiver for scanning and receiving through an antenna one or more digital radio channels; a wireless communications module for wirelessly transmitting data indicative of the radio channels to an external device and for receiving selection of a channel from an external device; a transmitter for transmitting a selected channel to the head unit via the wired feed; and a renewable energy unit for generating electrical energy for powering the digital radio receiver, wireless communications module and transmitter.

In the context of this specification, digital radio means any form of digitally modulated radio including but not limited to DAB, DAB+ and satellite radio.

The transmitter may be configured to covert data from the selected channel to a modulated analogue signal corresponding to a channel frequency, e.g. an FM frequency, selectable at the head unit.

The system may further comprise means to automatically scan for an available channel frequency, e.g. FM frequency, for the transmitter to transmit the selected channel. Alternatively, or additionally, the system may comprise a memory storing a plurality of analogue frequency presets which are assigned to a corresponding digital radio station and in which the transmitter is configured to transmit each of the digital radio stations on their respective preset frequencies to the head unit.

The digital radio receiver, wireless communications module, controller and renewable energy unit may be provided as part of self-contained antenna module configured to be connected to an antenna connector which feeds to a radio head unit.

The antenna module may comprise a whip or fin-type antenna and in which the digital radio receiver, wireless communications module and controller are housed within the module.

The digital radio receiver, wireless communications module, controller and renewable energy unit may be provided as a self-contained intermediate module having a connector on one end to be detachably connected to an antenna, and a connector at the other end configured to be connected to an antenna connector which feeds to a radio head unit.

A locking mechanism may be provided to securely lock the module to the antenna connector.

The renewable energy unit may comprise a wind turbine that supplies generated electrical energy to a battery which powers the digital radio receiver, wireless communications module and transmitter.

The renewable energy unit may be a wind power harvester.

The wind turbine may be located within the antenna module adjacent one or more grilles to enable ingress and/or egress of air as it drives the turbine.

The wind turbine may be horizontally or vertically mounted, and may be adjustable with respect to the antenna connector.

The renewable energy unit may comprise a solar cell or cells that supplies generated electrical energy to a battery which powers the digital radio receiver, wireless communications module and transmitter. A harvesting energy unit can harvest solar and kinetic energy and covert to electrical energy.

The solar cell or cells may be mounted on part of the antenna module.

The wireless communications module may be a Bluetooth module configured to communicate with a paired external device.

The system may further comprise means to scan and receive one or more analogue radio channels and, in the event that no digital radio channel is available, analogue radio channels are made available for transmission to the head unit.

A second aspect of the invention provides a digital radio receiver system provided as a single module for connection to the external antenna connector of a vehicle or the like, the system comprising: a radio receiver which is configured to scan and receive digital radio channels through an antenna; a wireless communications module for wirelessly transmitting to an external display and control unit information relating to the available channels and for receiving back a selected channel; a transmitter for decoding a selected channel and transmitting it as a modulated signal down a wired feed from the eternal antenna connector to an analogue radio head unit for output on a given channel; and a renewable energy unit provided on the module for powering the receiver, communications module and transmitter.

The powering may be by means of a battery which stores the energy from the renewable energy unit and powers the receiver, communications module and transmitter when required, at a later point in time.

The system may further comprise a geographic position identification means, e.g. a GPS receiver, and an information module configured to identify the position of the system when all or certain digital radio channels are not received, said identified position(s) being stored on local memory. Alternatively, or additionally, the identified positions may be stored on a memory card, e.g. SD card, or a USB device. The identified positions may thereafter be transmitted to a central server or database, and/or an external storage device such as a PC, mobile telephone or USB device.

A third aspect of the invention provides a method of delivering a digital radio signal in a module connectable to an existing wired feed to a radio head unit for outputting the signal, the method comprising: scanning for available digital radio channels; wirelessly transmitting to a local communications device the identity of the scanned digital radio channels; wirelessly receiving selection of a digital radio channel; and decoding the selected digital radio channel and transmitting as an analogue signal said channel data to the wired feed for output via the radio head unit.

A fourth aspect of the invention provides a digital radio receiver system for connection to a wired feed to a radio head unit, e.g. in a vehicle, the system comprising: a digital radio receiver for receiving through an antenna one or more digital radio channels; a memory for storing data indicating a plurality of analogue radio frequencies and associated with each a respective digital radio channel; and a transmitter for converting and transmitting simultaneously each of the digital radio channels identified on the memory down the wired feed on their associated analogue radio frequency for selective output at the radio head unit.

The system may further comprise a wireless communications module, e.g. a Bluetooth module, for communicating with an external device, wherein the memory further stores an analogue frequency which is associated with the wireless communications module, and wherein the transmitter is configured to covert and transmit data received from the external device via the wireless communications module down the wired feed on its associated analogue frequency for selective output at the radio head unit. The memory may be configured to receive said data from an external computer, which can be a PC or Macintosh or Linux machine The system may further comprise a geographic position identification means, e.g. a GPS receiver, and an information module configured to identify the position of the system when all or certain ones of said digital radio channels are not received, said identified position(s) being stored on local memory and/or transmitted to a remote location. The identified positions may be transmitted to a central server or database.

A fifth aspect of the invention provides a method of delivering a radio signal in a module connectable to an existing wired feed to a radio head unit for outputting the signal, the method comprising: storing data indicating a plurality of analogue radio frequencies and associated with each a respective digital radio channel; and receiving and decoding said digital radio channels and transmitting each over its associated stored analogue radio frequency down the wired feed for selective output at the radio head unit.

BRIEF DESCRIPTION OF THE DRAWINGS

The invention will now be described by way of non-limiting example with reference to the accompanying drawings, in which:

FIG. 1(b) shows front and side views of an alternative DAB receiver unit according to the invention;

FIG. 7 shows views of an example intermediate module for mounting on a vehicle exterior;

FIG. 10 shows views of a further example module for mounting on a vehicle exterior.

DETAILED DESCRIPTION OF PREFERRED EMBODIMENT(S)

Figure 1A:
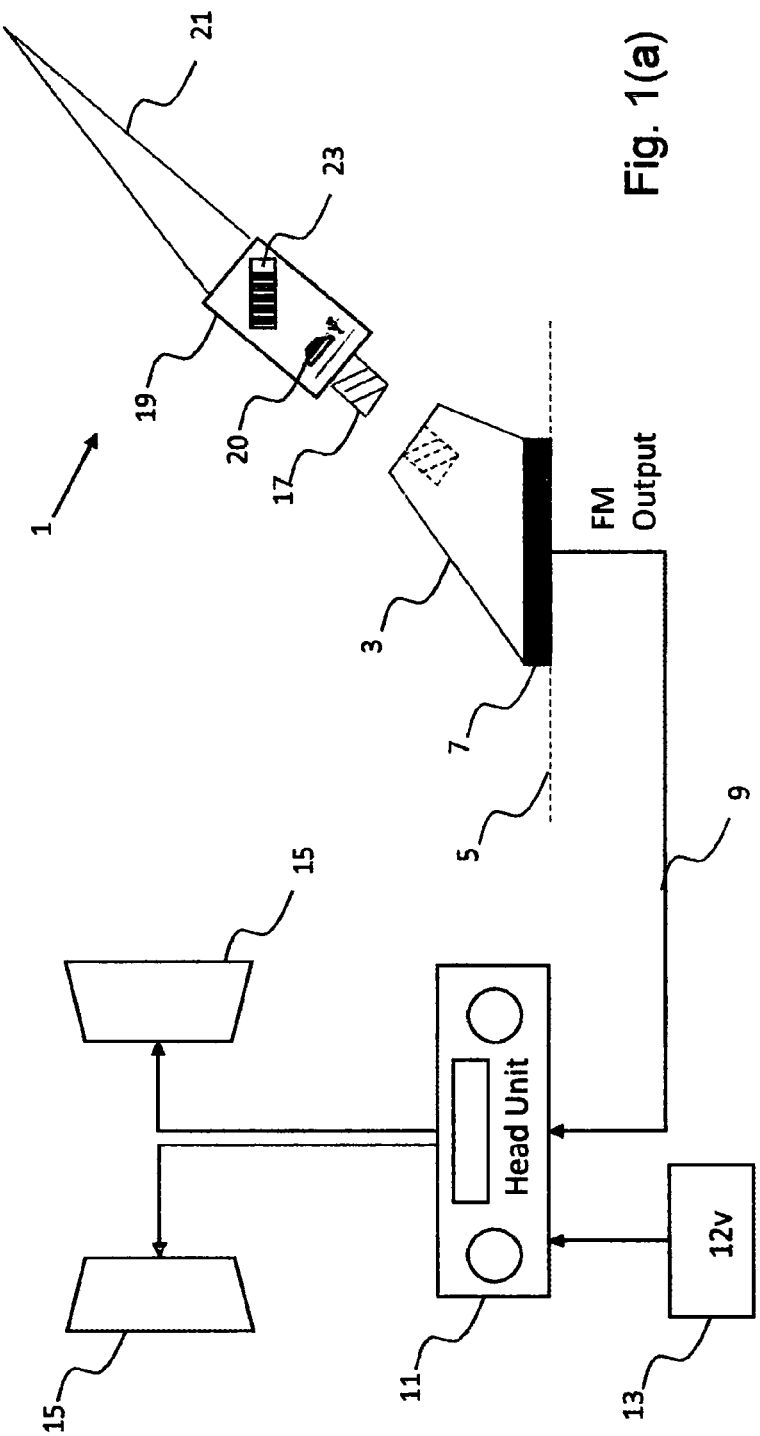
FIG. 1(a) is a schematic diagram of a DAB receiver unit according to the invention, provided as part of a car aerial unit, shown in relation to existing car audio infrastructure.

A first embodiment comprises a DAB receiver unit provided in the form of a self-contained aerial unit that comprises the functionality to scan, receive and indicate to a remote device (e.g. a head unit) both DAB and FM channels receivable through an on-board antenna which may be integrally attached or which may be detachable. Upon receiving selection of a channel from the remote device, the aerial unit transmits the channel (after decoding in the case of DAB) down the existing FM feed to the vehicle's head unit. This is done over an available FM frequency. The DAB receiver unit is designed, constructed and arranged to connect to the external antenna connector, commonly found on the roof of a vehicle, which connector is already connected via a wired feed to the vehicle's head end. This aerial unit in use replaces, or works with the existing, standard FM whip or fin type aerial fitted to vehicle exteriors. Attachment is by means of a threaded bolt that screws within the standard roof socket, for example the universally-used 4.5 mm socket. This socket has an existing wired connection to the FM input of the vehicle's head unit which handles analogue FM channel selection, channel display, and output to the speakers.

Further, the aerial unit comprises a renewable energy source, for example one or both of a wind turbine or solar cell(s) that converts kinetic/solar energy to electrical energy which is stored within an internal rechargeable (e.g. lithium) battery of the aerial unit for powering its internal electronics. In the case of a wind turbine, the travel of the vehicle will generate sufficient energy for an estimated 10 to 12 hours of continual usage when the vehicle is subsequently stationary.

A second embodiment is also described later on, in which a similar retro-fit aerial unit is provided, having a memory for storing a plurality of preset analogue frequencies, e.g. FM frequencies, assigned to each of which is a DAB radio station set by a user. In addition, as back-up, the FM frequency or frequency range that corresponds to the same radio station as each DAB station can also be stored. This is so that should the DAB signal fail, the same radio station can be sent in its FM form down the respective present FM frequency in hopefully a seamless manner. The assignment can be performed using an external computer program or application. The aerial unit may connect to a PC or similar computing device running the computer program through a wired connection, e.g. a USB or micro-USB connector, or over a wireless connection, e.g. a WiFi connection to a home network. The wired connection can enable charging of the unit. The aerial unit in this embodiment simultaneously transmits down the wired feed to the head unit each of the decoded DAB stations on their respective assigned frequency. At the head unit, therefore, the user can scan the FM spectrum to one of the assigned frequencies at which point the corresponding DAB station is output. In practise, the user may save the assigned frequencies to the head units preset buttons, as commonly provided.

This embodiment does not therefore require a remote device, e.g. a Bluetooth device, to select a DAB station from within the vehicle, as these are preset into the unit's memory. However, the memory may store a special frequency assigned to a remote Bluetooth device, and this frequency can be used to carry audio/video (generally 'media') sent from the Bluetooth device and transmit it down the wired feed to the head unit. This allows tracks saved on the Bluetooth device also to be played via the head unit.

Aspects of the first and second embodiments can be combined, e.g. with the preset channel memory in the second embodiment also being provided in the first embodiment. Both embodiments can be provided in a series of product options. Both embodiments can also utilise geographic positioning means, e.g. data from a GPS receiver, to identify dead zones (areas of weak or no signal) where all or certain DAB channels cannot be received, or the signal level is low, and to report the positions to an external system. The GPS positioning data can come from a portable device such as a mobile telephone or similar mobile terminal.

The first embodiment will now be described in detail.

Referring to FIG. 1(a), a self-contained DAB and FM aerial unit (hereafter "aerial unit") 1 is shown in relation to a vehicle's existing infrastructure. This existing infrastructure comprises an aerial base 3 connected to a car roof 5 by a rubber gasket 7. A wire feed 9 connects the base 3 to the FM input of the car's head unit 11 which comprises the facia, controls and electronics for demodulating, amplifying and outputting an analogue signal. The head unit 1 is powered by the car's 12v battery and audio is output to speakers 15. All this is conventional and so further explanation is not required.

The aerial unit 1 comprises a receiver module 19, a whip antenna 21 and a threaded bolt 17 connected to the receiver module 19.

The threaded bolt 17 connects to the socket in the base 3, providing an analogue output signal from the receiver module 19. The receiver module 19 itself is connected in this case to the whip antenna 21 (although any type of DAB compatible or capable antenna can be used) and circuitry within the receiver module is powered by stored energy harvested from a renewable energy source, in this case generated by a wind turbine 23 internal to the unit 1. The powering is indirect in the sense that the turbine 23 charges a battery 31. Alternatively or additionally, solar cell(s) may be mounted on or around the unit. Visible in FIG. 1 is one of a pair of grilles which enable ingress and egress of air as the car moves. A micro USB socket 20 is provided as another source of power to the internal battery 31 of the unit 1 and also for the transfer of data, if required.

FIG. 1(b) shows an alternative aerial unit 50 comprising a receiver module 51 having a base 52 for connection to the wired feed on the vehicle roof, an upper connector 53 for connection to an antenna, and front and rear grilles 54, 55 between which is positioned a vertically mounted wind turbine 60, although it is possible that the orientation may be off-vertical. The function and internal circuitry is considered largely identical to that shown in FIG. 1(a). A Bluetooth pairing button 56 is provided on the body exterior, covered by a bung or plug for waterproofing and/or dust protection, the role of which will be explained below. This button 56 may also serve as a power-on button, e.g. if held down it turns the unit 50 on, although the unit may also be configured to be turned on automatically upon detecting when the vehicle ignition is turned on and/or if the vehicle is moving. A micro-USB socket 57 is provided as another source of power to an internal battery and also for the transfer of data, if required.

In the aerial units 1, 50 the whip antenna 21 is shown permanently fixed to the receiver module 19, 51 as part of the unit but it can be a removable one by means of a bolt that secures to a top socket of the receiver module. The bolt (not visible in the Figure) will be substantially identical in dimensions to the bolt 17 on the base. In the case of the latter, the receiver module 19, 51 act as an intermediate module and all the user needs to do is unscrew the existing antenna 21 from the vehicle roof, connect the receiver module 19, 51 in its place, and then screw the antenna to the top. For ease of explanation, however, we will assume that the whip antenna 21 is permanently fixed to the receiver module 19, 51 in the following.

Any of the antennae disclosed herein could be a passive or powered (amplified) antenna, if sufficient power is available.

Figure 2:
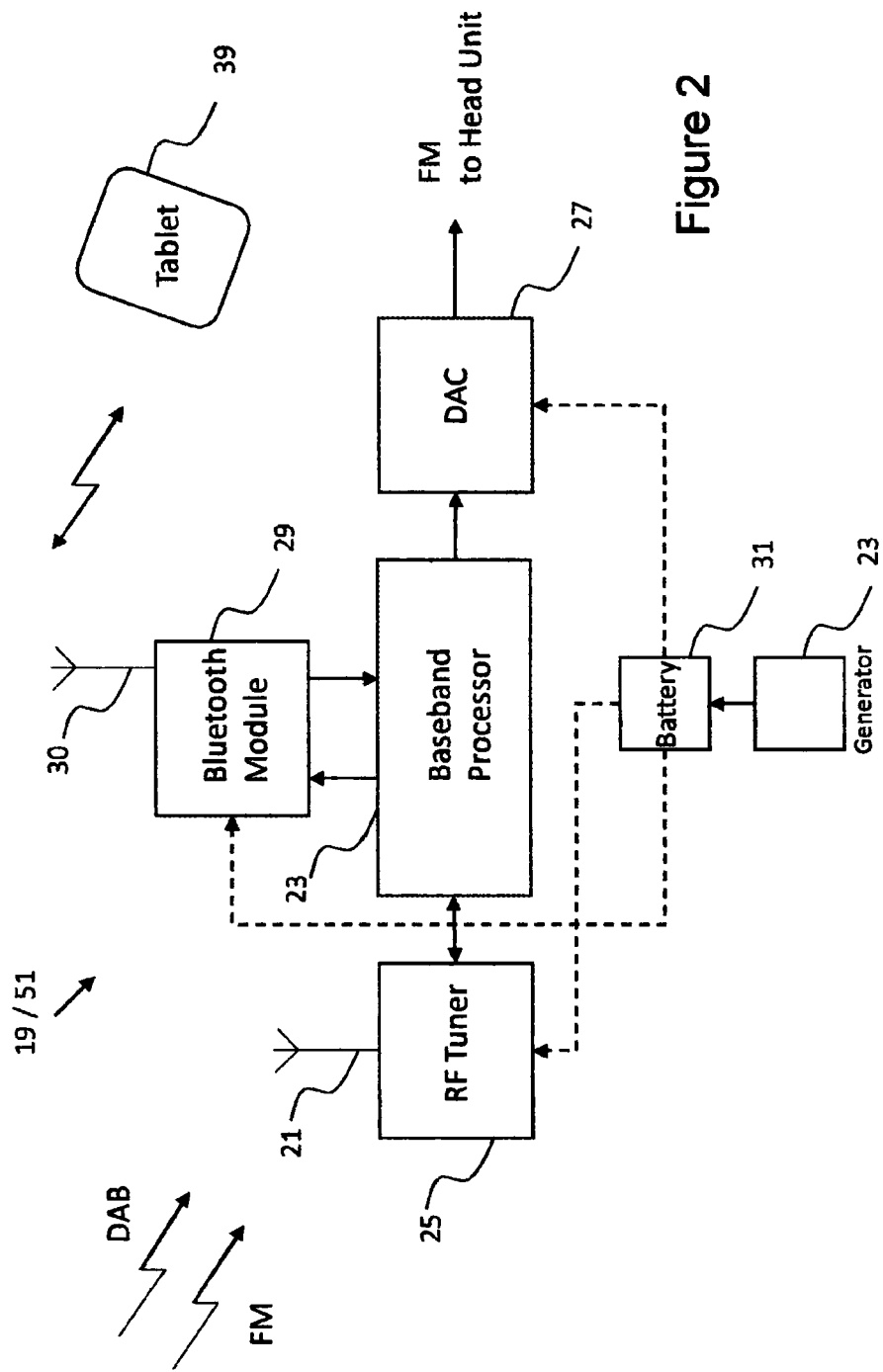
FIG. 2 is a block diagram of functional components of the DAB receiver unit in FIG. 1.

Referring now to FIG. 2, components of the receiver module 19, 51 comprise a baseband processor 23 which is connected to a RF tuner 25, a digital to analogue convertor (DAC) 27 and a Bluetooth module 29. The baseband processor 23 can be of any suitable form, including one or plural microcontrollers or microprocessors. Although not shown. RAM and external flash memory may also be connected to the baseband processor 23 to enable operation thereof. The baseband processor 23, RF tuner 25 and DAC 27 can be provided by a conventional off-the-shelf package, such as Frontier Silicon's Verona™ module. The Bluetooth module 29 can be an off-the-shelf CSR™ Bluetooth module. The baseband processor 23, RF tuner 25, DAC 27 and Bluetooth module 29 are collectively powered by a lithium ion 800 mA battery 31 which is charged by the aforementioned wind turbine 23.

The RF tuner 25 is both a DAB and FM tuner, although separate units can be used. It is connected to the whip antenna indicated by reference numeral 21.

Software or firmware is provided on the baseband processor 23 (or alternatively on a separate processor) to control the operation of the receiver module 19, 51 as will be explained below. Control of the receiver module 19, 51 is in this embodiment by means of a wireless terminal, likely to be a terminal such as smartphone or tablet 39, but it can be any portable communications device with a display screen and user inputs.

Figure 3:
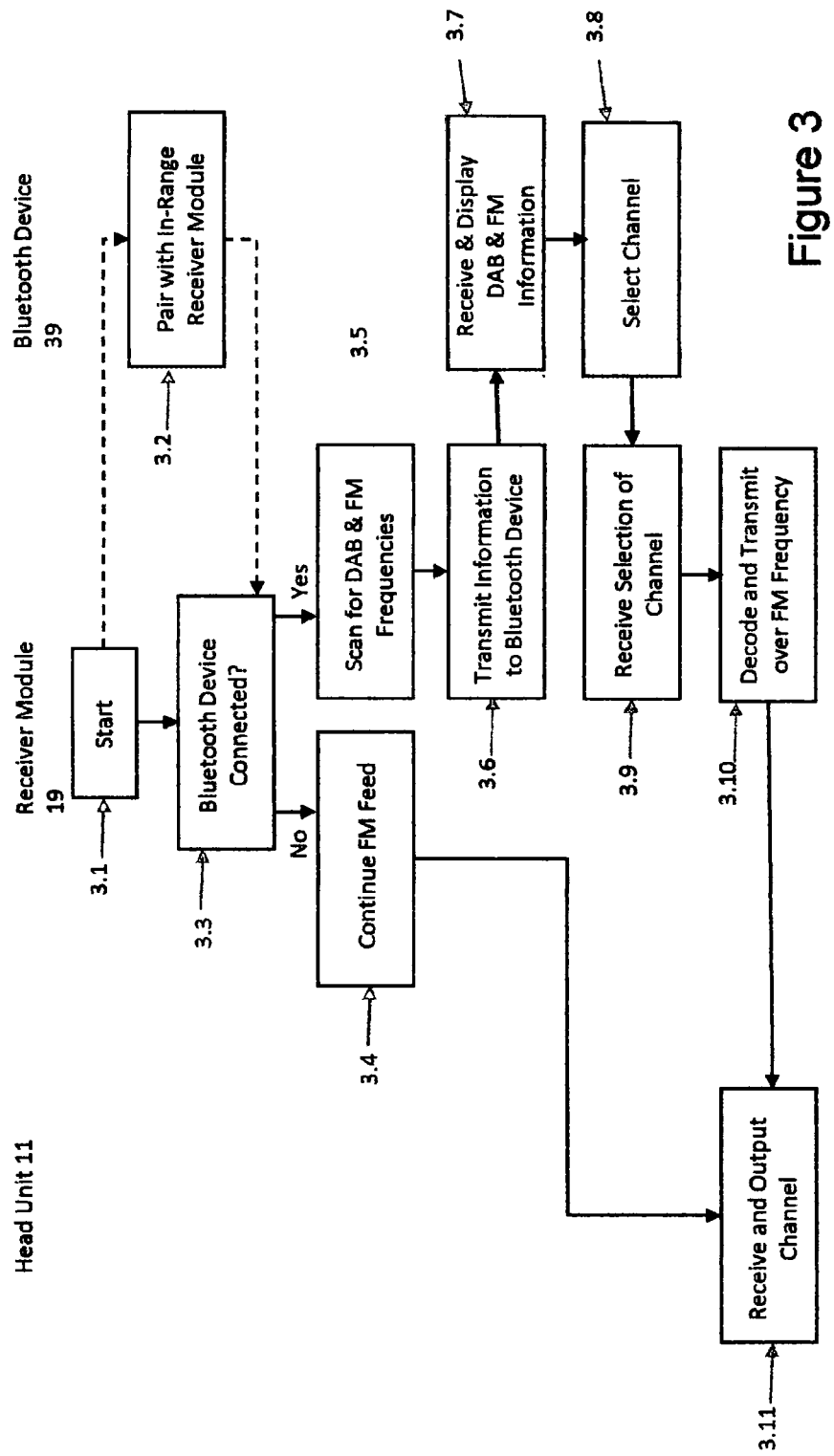
FIG. 3 is a flow diagram showing processing steps performed by the DAB receiver unit in FIG. 1.

Referring to FIG. 3, a first method of operation of the FIG. 2 components will be described in association with other components.

Step 3.1 indicates the start condition, e.g. when the car is first started. In step 3.2 the receiver unit 19 attempts to pair with an in-range Bluetooth device 39, i.e. the tablet in FIG. 2. The pairing can be an existing one that therefore occurs automatically, or a new one where the pairing has to be set-up. If the tablet 39 is not in-range or cannot be found (e.g. because it is switched off) then in step 3.3. the receiver unit 19 simply acts as a FM feed-through and in step 3.4 passes analogue FM signals down the wire feed 9 to the head unit 11. If in step 3.3. a paired connection is identified, then the RF tuner 25 is configured to scan available DAB (and FM) channels. In step 3.6 radiotext (or Dynamic Label Segment—DLS) data identifying the channel name, song titles, music type, images etc. is transmitted to the tablet 39 using Bluetooth. At the tablet 39 a dedicated "Application" is used to display this information in a form of Electronic Programme Guide (EPG) which can be selected using, e.g. touch gestures.

In step 3.8, a channel selection effected by the user on the tablet 39 app causes a selection signal to be sent back to the receiver module 19, 51 over Bluetooth. When received at step 3.9 the selected channel is received, decoded and transmitted over an available FM frequency down the wire feed 9 as an analogue signal for output by the head unit 11 in the conventional way, i.e. at step 3.11.

Figure 4:
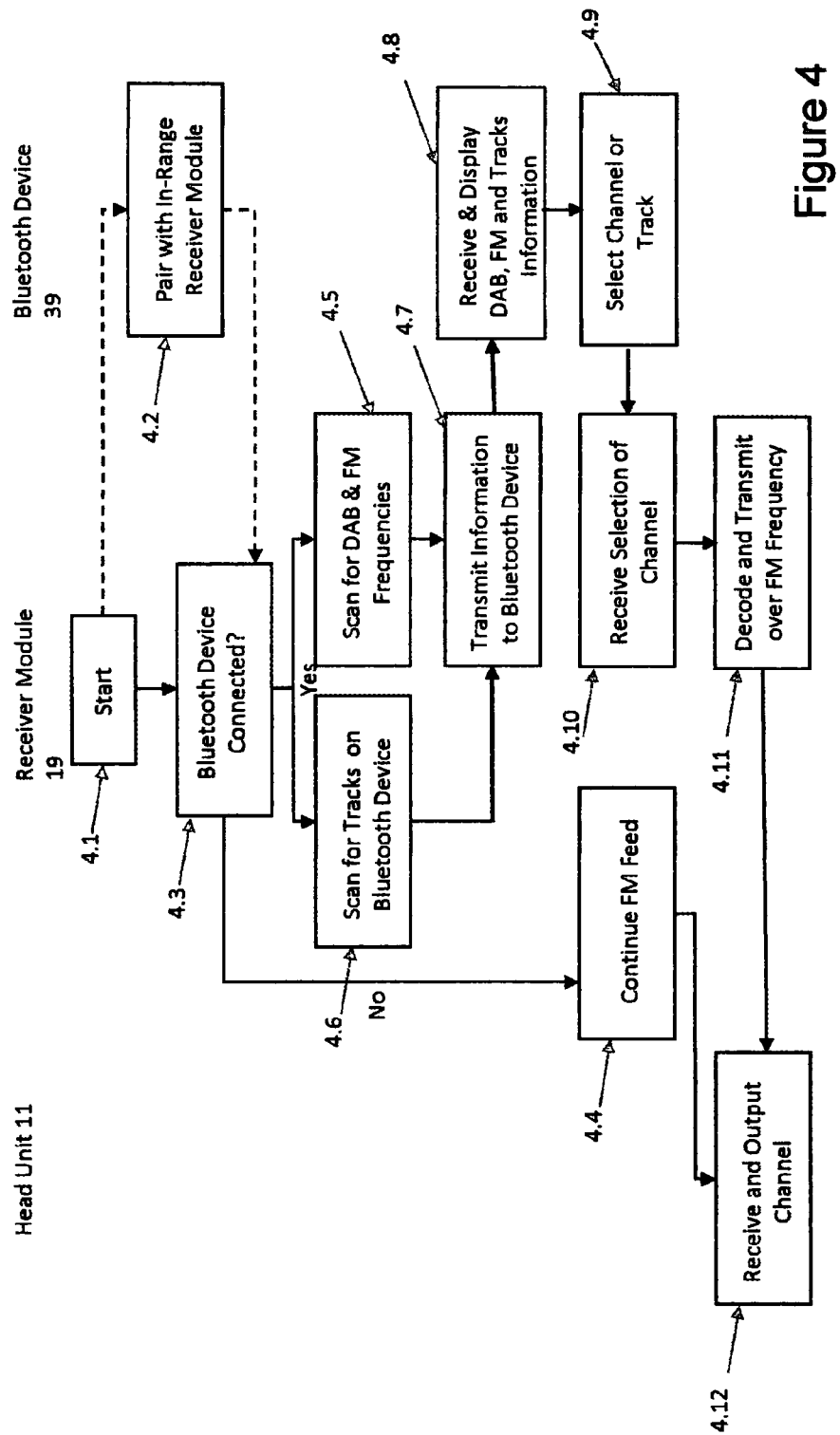
FIG. 4 is a flow diagram showing processing steps in an alternative setup performed by the DAB receiver unit in FIG. 1.

FIG. 4 shows an alternative method of operation, which is different in that audio tracks stored on the tablet 39 are also scanned for (in step 4.6) and in step 4.7 both the track information and the DAB DLS information is transmitted to the tablet 39 for selection. The user is therefore presented with more options for playback through the App EPG. Otherwise, the operation is the same as that shown in FIG. 3.

If at any point in the operation the DAB signal is lost, the receiver module 19, 51 will revert to FM operation.

The choice of FM frequency over which to send DAB channels or tracks down the wire feed 9 can be done manually. In some embodiments, the receiver module 19, 51 is configured to automatically locate a free frequency in the conventional manner. This can be performed periodically.

An additional step may be incorporated into the methods shown in FIGS. 3 and 4 which is to transmit a brand name associated with the product along with the FM signal as Radio Data System (RDS) information for display at the head unit 11.

The wind turbine 23 may be mounted horizontally, or substantially horizontally, within the body of the receiver unit 19 so that it rotates about a vertical axis. This enables energy generation as the car moves forwards. It is estimated that the battery will provide 10 to 12 hours of continual usage when the car is stationary following a non-trivial period of driving. The FIG. 1(b) embodiment employs a vertically-mounted wind turbine 60 which also achieves efficient operation as the vehicle moves, causing rotation of the blades. In both cases, the position of the turbine 23, 60 relative to the vehicle can be adjusted, e.g. by a hinge or ball joint, in one or more dimensions.

It will therefore be appreciated that the receiver module 19, 51 provides an elegant retro-fit solution to providing a DAB service to any vehicle by utilising its existing wired feed 9 from the roof-mounted aerial connector to head unit 11. The provision of the in-built power generator(s) removes the requirement for the unit 19 to be connected to the battery, e.g. using the lighter socket or a direct connection to the loom, and lowers the carbon footprint by using a renewable source. The local, personal area network (PAN) provided by Bluetooth removes the need for a dedicated control unit. No specialist technical expertise is necessary to retro-fit the module 19.

Figure 5:
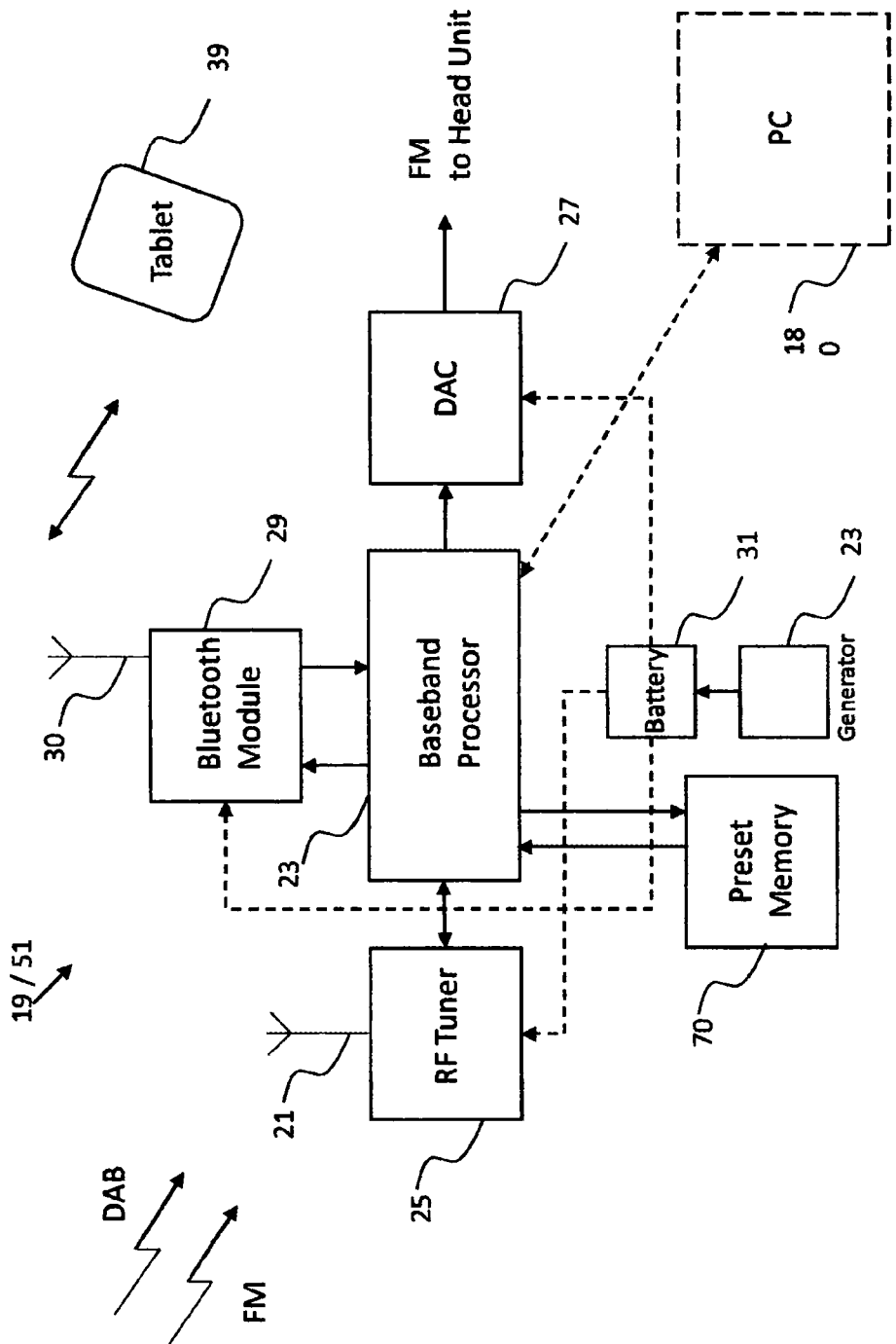
FIG. 5 is a block diagram of functional components of the DAB receiver unit in FIG. 1 in a second embodiment.
Figure 6:
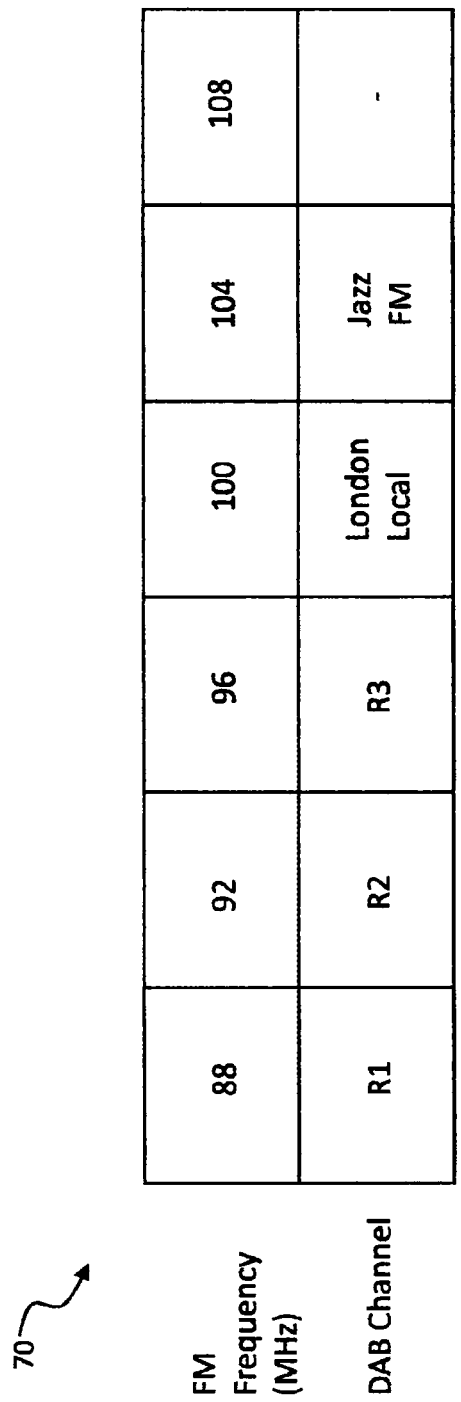
FIG. 6 is a schematic diagram of DAB to FM frequency preset assignments, which is useful for understanding the operation of the second embodiment.

A second embodiment is shown in FIG. 5. In this case, the receiver module 19, 51 is identical to that of the first embodiment, but there is also provided a preset memory 70 which stores within it data assignments between each of a plurality of different FM radio frequencies and a DAB frequency channel. FIG. 6 indicates schematically example assignments in which six FM frequencies are shown. Against five of these frequencies are assigned a respective DAB channel and its FM equivalent as backup should the DAB channel fail. This assignment is preferably performed using a special application program stored on an external computer, e.g. the PC 80 indicated in FIG. 6. Alternatively, a Bluetooth device such as the smart terminal (e.g. tablet) 39 can be used to set the assignment, using a dedicated "App". The use of WiFi can be employed to set the assignment without the need to disconnect the receiver module 19, 51 from the vehicle, if the module has a suitable communications module provided. The user can communicate with the module 19, 51 when the vehicle is close-by, in the driveway for example, and set the assignment using the smart terminal 39 or PC 80.

In use, the user will remove the module 19, 51 from the vehicle, and connect it using the micro-USB port 20, 57 to the PC 80. The user selects via a Graphical User Interface (GUI) which five DAB stations from a presented menu are to be allocated to each distinct frequency. When the user has finished, the receiver module 19, 51 is synchronised to the application program and the assignments are stored on the memory 70 as in FIG. 6.

If the module has data connectivity, e.g. a Bluetooth, WiFi or 3G/4G module (for which a SD/SIM card port and enabling network card will be needed) then the synchronisation may be performed wirelessly. This will be available for more high-specification cars where the receiver module 19, 51 is attached to the vehicle in a more permanent way.

In use, when the receiver module 19, 51 is re-connected to the vehicle and so to the wired feed 9 and to the head unit 11, each of the five digital channels is received, decoded and simultaneously transmitted to the head unit over the distinct, respective FM frequencies. Thus, only these five FM frequencies will be available at the head unit 11 and scanning the head unit across the FM spectrum in the normal way (whether a manual or auto scan) will detect them to allow output of the associated DAB channel. In practise, a user will likely assign the frequencies to respective preset buttons on the head unit 11.

In some embodiments, multiple tuners and/or baseband processors and/or DACs can be employed, i.e. one for each of the channels being simultaneously being transmitted.

It will be appreciated that in this second embodiment, the use of the Bluetooth module 29 for displaying and selecting a DAB channel is not necessary; rather five DAB channels are preset into the module 19.

Having said that, the sixth FM frequency shown in FIG. 6 is a special frequency that is associated with the Bluetooth module 29. Any data received by the Bluetooth module 29, e.g. a track sent from the user's tablet 39, is transmitted down the wired feed 9 over this sixth FM frequency simultaneously with the five DAB channels for selective output at the head unit 11.

The application program for setting up and synchronising the preset memory 70 may be associated with a user account with a remote server. In this way, user preferences can be stored in association with the account. As is conventional, initially, the user will need to set up the account, including inputting an ID associated with their module 29 hardware, as well as a username and password.

Certain other features which are applicable to the first and second embodiments will now be described.

In some embodiments, there is provided the ability to identify the geographic location of the receiver module 19, 51 and to use the location when no DAB channels are available (i.e. because the car is in a dead zone), or certain DAB channels are unavailable, to provide to a central server or database the location information. In a refinement, DAB signal strength can be recorded and uploaded to the server to provide an overall picture. In this way, the central server can maintain an up-to-date picture or map of DAB service quality based on a regular update stream from potentially very many mobile units.

The geographic location may be obtained by a GPS receiver provided in the receiver module 19, 51, 90 or perhaps within the smart terminal (e.g. tablet) 39. Cellular triangulation may be used as an alternative or backup source of location information. In operation the receiver module 19, 51, 90 identifies when no DAB signal or channel(s) is or are received (or signal strength information) and at that time causes the current location to be recorded. Where the location is determined on the receiver module 19, 51 it can be stored locally and/or passed to the tablet 39 for subsequent uploading to the central server. Where the location is determined on the tablet 39, it simply stores the location when the received DAB channels received over the Bluetooth link drop out. The locations are subsequently uploaded to the central server.

Uploading to the central server can be by means of any data channel when available. For example, if the tablet 39 has a WiFi/3G/4G connection available, this offers one method of uploading. It is possible that the car itself may have an internet connection through a PAN, which can be used. An alternative or additional method is through docking the tablet 39 to a home computer.

In some embodiments, software within the receiver module 19, 51 is configured to detect and store different routes or journeys, as well as dead zone information along the route or journey. In the event that the progress of a stored journey is detected as being taken by the vehicle subsequently, then the software is configured to predict approaching dead zones and thereby switch to the FM equivalent in advance of vehicle entering the dead zone. Subsequently, when the dead zone is exited according to the stored information, the DAB station is returned to.

In some embodiments, the receiver module 19, 51 receives a source of power from the car itself, which may be the case where the module is fitted to a high-specification car in which the existing aerial also houses a GPS receiver which draws power from the battery.

In some embodiments, the receiver module 19, 51 is configured automatically to switch on and/or pair with a Bluetooth device 39 in accordance with a signal received wirelessly from the vehicle. In this regard, as is known, there is an on-board diagnostic port provided on most cars referred to as OBD-II. This takes data from various sensors of the vehicle primarily for diagnostic purposes. It is currently possible to purchase off-the-shelf an OBD-II Bluetooth unit which in the case of the first and second embodiments described, would permit the status of the vehicle (e.g. ignition on) to be transmitted wirelessly over Bluetooth to the Bluetooth module 29 for switching the receiver module 19, 51 on and/or for initiating pairing. Another option of using the OBD-II port may be to alter the volume of the signal output based on sensed engine speed, with the volume being increased automatically as the engine RPM increases.

Although DAB has been given in the embodiments as an example of a digital radio system, it will be appreciated that the system and methods are applicable to other digital radio technologies. Similarly, whilst Bluetooth has been used as the local data streaming technology and protocol, alternatives may be used. Similarly, in place of the tablet 39, any portable display device having a wireless communications function enabling data exchange with the receiver module 19, 51 can be used, for example a smartphone.

Figure 8B:
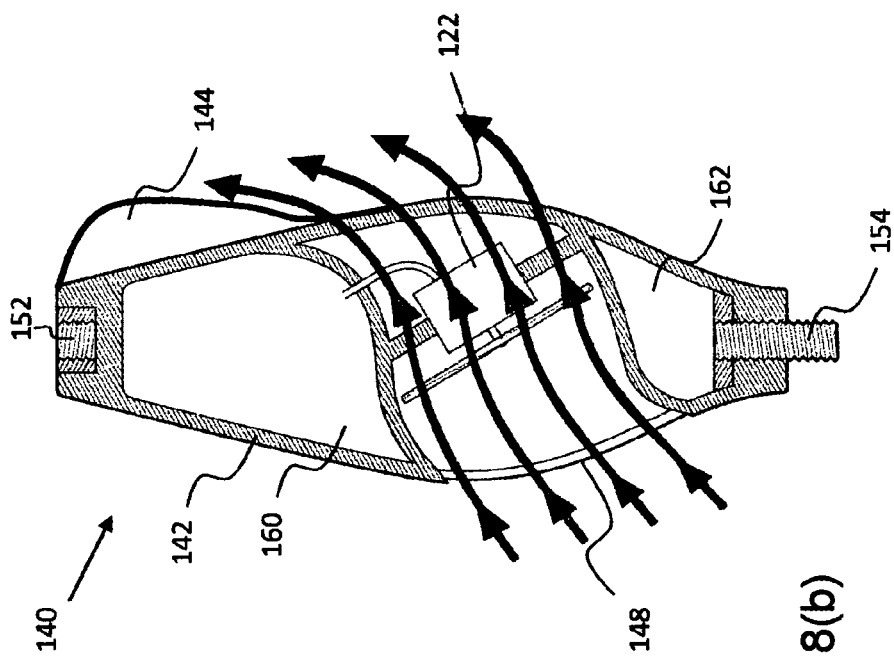
FIG. 8 shows views of a further example intermediate module for mounting on a vehicle exterior.
Figure 8A:
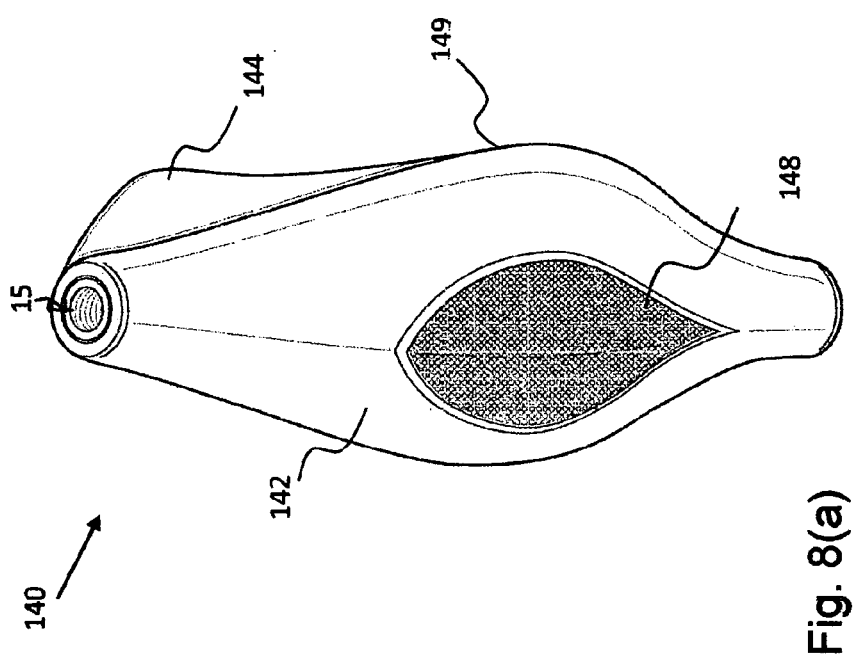
Figure 9:
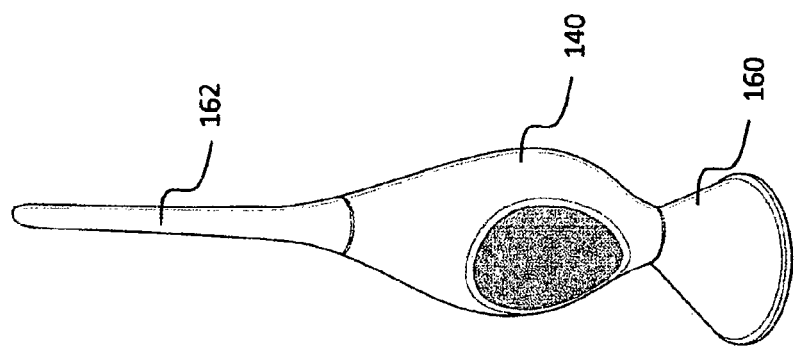
FIG. 9 shows the FIG. 8 module connected to a base unit and with an antenna connected to the top.
Figure 8C:
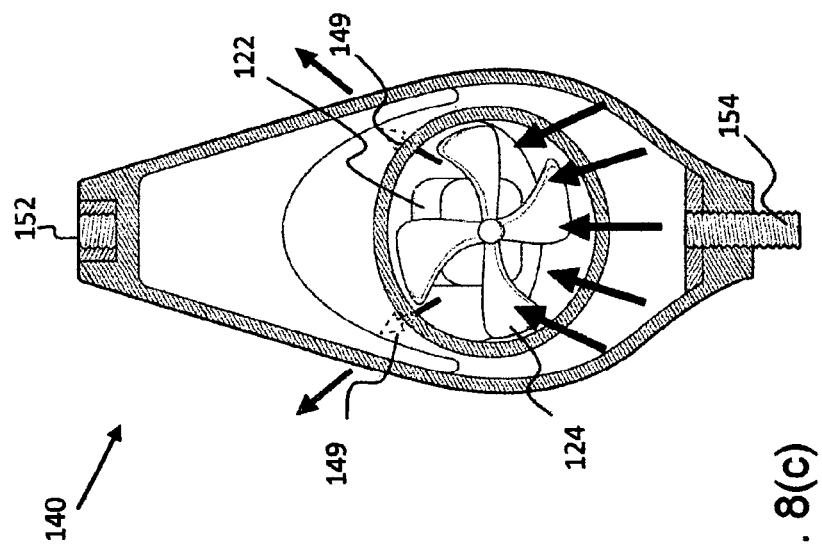

A number of practical intermediate receiver modules which can be used for modules 19, 51 are shown in FIGS. 7 to 9. Each is an intermediate unit, meaning that the modules are secured to the existing socket on a vehicle roof and the existing aerial secured to a top socket, as will be explained.

FIGS. 7(*a*) and 7(*b*) show a first intermediate receiver module 100 which comprises a plastics or metallic housing having a fore surface 102 which is a polyhedron comprising of four flat surfaces part of which are solid and part of which comprise a grille 104 into which air can be received in use. The flat surfaces meet at an apex point 106 within the grille 104. To the rear of the housing is an aft fin 108 which projects upwardly and backwards. Overall, the shape is found to be aerodynamic. A pair of vents 110 (only one of which can be seen in the Figures) allow the egress of air from the internal part of the module 100. A top socket 112 is a 4.5 mm socket for receiving connection of a vehicle antenna. A bottom bolt 114 is a 4.5. mm bolt for connection to a standard socket on a vehicle, connected to the existing FM feed.

FIG. 7(*b*) is a cross-sectional view of the receiving module 100 and it will be seen that a wind turbine 121 is mounted within a central chamber 123 which is angled generally upwards towards the rear with the central axis X-X at about 25 degrees to the horizontal. Air is scooped upwardly through the central chamber 123 and causes the wind turbine 121 to turn. The wind turbine 121 itself comprises a generator 122 with a central rotor and plurality of blades 124 angled downwardly, transverse to X-X, so that the upwardly moving air causes them to turn. Air is exhausted through the side vents.

The hardware used in the modules 19, 51, including the battery and electronic circuitry, is securely located within one of two watertight chambers 126, 127, or can be divided between both. In this case, a lead 126 carrying the electricity generated by the wind turbine 121 is shown entering the upper chamber 126 where the battery (at least) will be stored. The FM analogue signal will be connected to the bolt 114.

FIGS. 8(*a*)-(*c*) show a second intermediate receiver module 140, which is similar to that shown in FIG. 7 but in this case comprises a generally smooth and curved fore surface 142 and a curved aft fin 144. Otherwise, there are the same grille 148, top socket 152 and bottom bolt 154 components and rear vents 149, as well as the internally-mounted turbine 122 (comprising of generator 122 and blades 124) and upper and lower watertight chambers 160, 162 for battery, components and circuitry.

FIG. 9 is a perspective view of the second intermediate receiver module 140 when connected to the base 160 provided on a vehicle roof, and also with a whip aerial 162 connected to the top socket 152.

Figure 11:
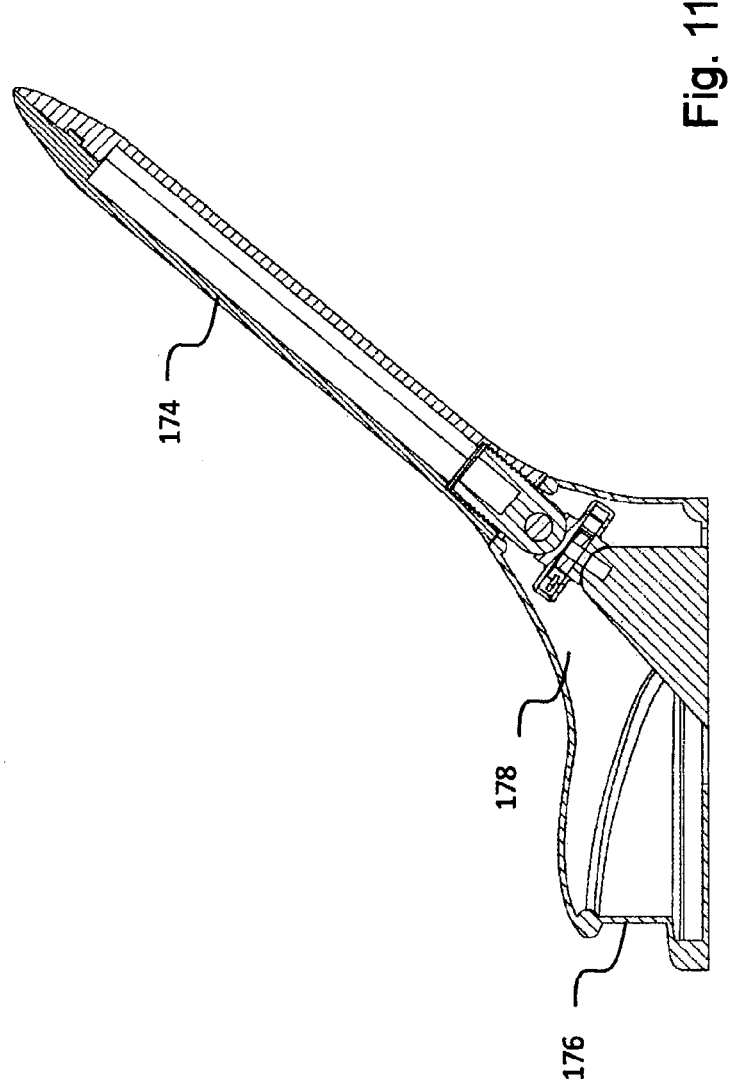
FIG. 11 is a cross-sectional view of the FIG. 10 module.

FIGS. 10 and 11 show a still further practical example of a receiver module 170 that may be retro-fitted to a vehicle's exterior. The module 170 can be an intermediate unit or one with an integral antenna. The module 170 comprises an aerodynamic base 172 which houses the battery module, aforementioned electronic circuitry etc. A whip-type antenna 174 is connected to the aft end of the base 172, extending upwardly at approximately 45 degrees. At the front end of the base 172 is the renewable energy unit 176, which can be a wind turbine or solar panel or combination of both. For example, the wind turbine 176 can be horizontally mounted so that it rotates efficiently about a vertical axis as the vehicle moves forwards. The module 170 is relatively compact and its shape is conducive to efficient, aerodynamic operation. A bolt (not shown) which extends from the lower wall of the base 176 can be used (as with the other aforementioned modules) to connect the internal circuitry to the existing socket on the vehicle which feeds to the vehicle's head unit.

FIG. 11 shows the receiver module 170 in cross-section, in which it will be seen that an internal space 178 is provided within which the battery module and electronic circuitry can locate. As with other embodiments, a Bluetooth pairing button, power button and socket can be provided on the exterior.

In some embodiments, when the receiver module is switched off, or no power available, it will continue to function as a regular FM receiver.

In some embodiments where the aerial is built-in or integral, it will be a powered (amplified) aerial.

The term renewable energy is interchangeable and synonymous with harvested energy, being the process of deriving energy from external sources, such as solar power, thermal energy, wind energy and kinetic energy.

It will be appreciated that the above described embodiments are purely illustrative and are not limiting on the scope of the invention. Other variations and modifications will be apparent to persons skilled in the art upon reading the present application.

Moreover, the disclosure of the present application should be understood to include any novel features or any novel combination of features either explicitly or implicitly disclosed herein or any generalization thereof and during the prosecution of the present application or of any application derived therefrom, new claims may be formulated to cover any such features and/or combination of such features.

The invention claimed is:

1. A digital radio receiver system for connection to an existing wired feed to a radio head unit, the system comprising:
    a casing;
    a digital radio receiver for scanning and receiving through an antenna one or more digital radio channels;
    a wireless communications module for wirelessly transmitting data indicative of the radio channels to an external device and for receiving selection of a channel from an external device;
    a transmitter for transmitting a selected channel to the head unit via the wired feed; and
    a renewable energy unit for generating electrical energy for powering the digital radio receiver, wireless communications module and transmitter, wherein the renewable energy unit comprises a wind turbine that supplies generated electrical energy to a battery which powers the digital radio receiver, wireless communications module and transmitter, and wherein the wind turbine is mounted within a generally arcuate opening in a front surface of the casing.

2. The system according to claim 1, wherein the transmitter is configured to covert data from the selected channel to a modulated analogue signal corresponding to a channel frequency, selectable at the head unit.

3. The system according to claim 2, further comprising a memory storing a plurality of analogue frequency presets which are assigned to a corresponding digital radio station and in which the transmitter is configured to transmit each of the digital radio stations on their respective preset frequencies to the head unit.

4. The system according to claim 2, further comprising means to automatically scan for an available channel frequency, for the transmitter to transmit the selected channel.

5. The system according to claim 1, wherein the digital radio receiver, wireless communications module, transmitter and renewable energy unit are provided as part of a self-contained antenna module configured to be connected to an antenna connector which feeds to the radio head unit.

6. The system according to claim 1, wherein the self-contained antenna module comprises a bolt extending from a bottom of said self-contained antenna module, and which is dimensioned and arranged to locate within an existing antenna connector socket located externally on a vehicle, for interconnecting internal circuitry of the self-contained antenna module and the existing wired feed.

7. The system according to claim 5, wherein the antenna module comprises a whip or fin type antenna and in which the digital radio receiver, wireless communications module and transmitter are housed within the antenna module.

8. The system according to claim 1, wherein the wind turbine is located within the antenna module adjacent one or more grilles to enable ingress and egress of air as it drives the turbine.

9. The system according to claim 1, wherein the wind turbine is vertically mounted.

10. The system according to claim 1, wherein the wind turbine is horizontally mounted so as to rotate about a generally vertical axis.

11. The system according to claim 5, wherein the renewable energy unit further comprises a solar cell or cells that supplies generated electrical energy to a battery which powers the digital radio receiver, wireless communications module and transmitter.

12. The system according to claim 11, wherein the solar cell or cells are mounted on part of the antenna module.

13. The system according to claim 1, wherein the wireless communications module is a Bluetooth module configured to communicate with a paired external device.

14. The system according to claim 1, further comprising means to scan and receive one or more analogue radio channels and, in the event that no digital radio channel is available, analogue radio channels are made available for transmission to the head unit.

15. A digital radio receiver system provided as a single module for connection to an external antenna connector of a vehicle, the system comprising:
    a casing;

a radio receiver which is configured to scan and receive digital radio channels through an antenna;

a wireless communications module for wirelessly transmitting to an external display and control unit information relating to the available channels and for receiving back a selected channel;

a transmitter for decoding a selected channel and transmitting it as a modulated signal down a wired feed from the eternal antenna connector to an analogue radio head unit for output on a given channel; and a renewable energy unit provided on the module for powering the receiver, communications module and transmitter, wherein the renewable energy unit comprises a wind turbine that supplies generated electrical energy to a battery which powers the digital radio receiver, wireless communications module and transmitter, and wherein the wind turbine is mounted within a generally arcuate opening in a front surface of the casing.

16. The system according to claim 15, further comprising geographic position identification receiver, and an information module configured to identify a position of the system when all or certain digital radio channels are not received, said identified position being stored on local memory and/or being transmitted to a remote location.

17. A digital radio receiver system for connection to a wired feed to a radio head unit, the system comprising:

a casing;

a digital radio receiver for receiving through an antenna one or more digital radio channels;

a memory for storing data indicating a plurality of analogue radio frequencies and associated with each a respective digital radio channel;

a transmitter for converting and transmitting simultaneously each of the digital radio channels identified on the memory down the wired feed on their associated analogue radio frequency for selective output at the radio head unit; and a renewable energy unit for generating electrical energy for powering the digital radio receiver, the memory and the transmitter, wherein the renewable energy unit comprises a wind turbine that supplies generated electrical energy to a battery which powers the digital radio receiver, the memory and the transmitter, and wherein the wind turbine is mounted within a generally arcuate opening in a front surface of the casing.

* * * * *